(12) United States Patent
Chou et al.

(10) Patent No.: US 8,284,296 B2
(45) Date of Patent: Oct. 9, 2012

(54) CONTINUOUS FOCUSING METHOD FOR DIGITAL CAMERA

(75) Inventors: Chan-Min Chou, Taipei County (TW); Chia-Lun Tsai, Changhua County (TW); Chih-Pin Yen, Taipei County (TW)

(73) Assignee: Altek Corporation, Hsinchu (TW)

( * ) Notice: Subject to any disclaimer, the term of this patent is extended or adjusted under 35 U.S.C. 154(b) by 316 days.

(21) Appl. No.: 12/772,458

(22) Filed: May 3, 2010

(65) Prior Publication Data

US 2011/0063494 A1 Mar. 17, 2011

(30) Foreign Application Priority Data

Sep. 16, 2009 (TW) .............................. 98131258 A

(51) Int. Cl.
*H04N 5/232* (2006.01)
*H04N 5/228* (2006.01)
*G03B 13/00* (2006.01)

(52) U.S. Cl. .................................. 348/353; 348/208.12

(58) Field of Classification Search ............. 348/208.12, 348/345, 349, 353
See application file for complete search history.

(56) References Cited

U.S. PATENT DOCUMENTS

| | | | | |
|---|---|---|---|---|
| 6,181,378 B1 * | 1/2001 | Horie et al. ................... 348/353 |
| 7,133,078 B2 * | 11/2006 | Nagasawa ..................... 348/353 |
| 7,304,681 B2 * | 12/2007 | Larner et al. ................... 348/352 |
| 7,515,820 B2 * | 4/2009 | Nakai et al. ..................... 396/125 |
| 7,671,918 B2 * | 3/2010 | Onozawa ....................... 348/345 |
| 7,822,334 B2 * | 10/2010 | Ono et al. ...................... 396/128 |
| 7,989,745 B2 * | 8/2011 | Suzuki ......................... 250/201.2 |
| 8,054,372 B2 * | 11/2011 | Oi ................................. 348/349 |
| 8,106,997 B2 * | 1/2012 | Nagahata et al. ............. 348/345 |
| 2003/0193600 A1 * | 10/2003 | Kitamura et al. ........ 348/333.01 |
| 2006/0062484 A1 * | 3/2006 | Aas et al. ....................... 382/255 |
| 2011/0058096 A1 * | 3/2011 | Chou et al. .................... 348/349 |
| 2011/0069190 A1 * | 3/2011 | Chou et al. .................. 348/222.1 |
| 2011/0096207 A1 * | 4/2011 | Izumi et al. ................... 348/241 |

\* cited by examiner

*Primary Examiner* — John Villecco
(74) *Attorney, Agent, or Firm* — Morris Manning & Martin LLP; Tim Tingkang Xia, Esq.

(57) ABSTRACT

A continuous focusing method for a digital camera is described, which is applicable to determine whether the digital camera performs a focusing procedure or not when the digital camera switches from a first scene to a second scene in a live view stage. The continuous focusing method includes the following steps. A preview image of a second scene is obtained. A blur detection procedure is performed on the preview image, so as to acquire a corresponding focus value. It is determined whether the focus value exceeds a focusing threshold value or not; if not, a focusing procedure is performed; otherwise, if the focus value is greater than the focusing threshold value, the digital camera still maintains a current focusing focal length, which represents that a focusing focal length of the second scene is the same as that of the first scene.

1 Claim, 12 Drawing Sheets

CONTINUOUS FOCUSING METHOD FOR DIGITAL CAMERA

CROSS-REFERENCE TO RELATED APPLICATIONS

This non-provisional application claims priority under 35 U.S.C. §119(a) on Patent Application No(s). 098131258 filed in Taiwan, R.O.C. on Sep. 16, 2009, the entire contents of which are hereby incorporated by reference.

BACKGROUND OF THE INVENTION

1. Field of the Invention

The present invention relates to a focusing method, and more particularly to a continuous focusing method for determining whether to adjust a focusing focal length or not when a digital camera is switching scenes.

2. Related Art

A user usually takes a picture with a digital camera in the following several stages. First, the digital camera is turned on; at this time, the digital camera enters a live view stage. Second, the user half presses a shutter after aiming at an object to be shot, and at the same time, the digital camera enters an auto focusing stage. Third, the user fully presses the shutter, and at this time, the digital camera enters a shooting stage.

The so-called live view stage means previewing scenes with the digital camera before the user presses the shutter. In other words, the digital camera continuously captures different scene pictures during the live view stage and displays the image pictures on a liquid crystal display of the digital camera. At this time, the digital camera continues auto focusing on the scenes, thereby adjusting the lens to suitable focusing positions. In such a manner, the estimation duration for subsequent focusing may be decreased.

In the auto focusing stage, the digital camera starts to adjust a focal length between a lens assembly and an object to be shot in the scene after the user half-presses the shutter. At this time, a focusing object of the digital camera is the object to be shot. Therefore, the digital camera may adjust the focal length for the object to be shot once again. The shooting stage means that the digital camera records a current image picture as a digital image when the user fully presses the shutter.

Taking the continuous focusing procedures during the live view stage as an example, the digital camera performs comparison calculation on a plurality of continuous images. When a lens position of the digital camera is at a different position, the digital camera obtains a contrast value for the definition of each image. Next, the digital camera obtains an optimal focusing focal length through a quadratic curve approximation manner according to a relation between the contrast value and the focal length. However, when the digital camera switches scenes, the lens keeps performing zooming out/in motions. As a result, not only the focusing duration of the digital camera is prolonged, but also the power consumption of the digital camera is severely increased.

SUMMARY OF THE INVENTION

In view of the problems above, the present invention is a continuous focusing method for a digital camera, which is applicable to determine whether the digital camera performs a focusing procedure or not when the digital camera switches from a first scene to a second scene during a live view stage.

In order to achieve the above objective, the present invention provides a continuous focusing method for a digital camera, which comprises the following steps. A preview image of a second scene is obtained. A blur detection procedure is performed on the preview image, so as to acquire a focus value. When the focus value does not exceed a focusing threshold value, a focusing procedure is performed.

In this embodiment, the so-called focusing procedure comprises the following steps. At least one sampling area is further set in the preview image, in which the sampling area has a plurality of image pixels. Pixel values of every two adjacent image pixels in the sampling area are compared respectively to obtain a plurality of contrast differences. The number of the contrast differences greater than a preset threshold value is accumulated as a focus value.

From another viewpoint of the present invention, the focusing procedure comprises the following steps. An image edge detection procedure is performed on the preview image to obtain a plurality of edge pixels. A plurality of selected continuous pixels is selected from the edge pixels. A maximum value among difference values of pixel values of the adjacent selected pixels is taken as an adjacent difference value. A maximum difference value of the selected pixels is taken as a total difference value. The adjacent difference value is divided by the total difference value to obtain a contrast ratio. The number of contrast ratios greater than a preset threshold value is accumulated as a focus value.

The present invention provides a continuous focusing method for a digital camera, which is applicable to determine whether the digital camera needs to adjust a focusing focal length again after the digital camera switches between different scene pictures. In such a manner, the digital camera does not need to drive lenses to perform focusing motions continuously, thereby realizing the power saving and fast in-focus effects.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Currently, without special settings, most digital cameras enter a live view stage (or referred to as an S0stage) after being powered on, and perform a continuous focusing procedure at the same time. A continuous focusing method for a digital camera of the present invention is applicable to determine whether the digital camera performs a continuous focusing procedure or not when the digital camera switches from a first scene to a second scene in the live view stage.

In order to clearly illustrate the first scene and the second scene in the present invention, two continuous digital images are defined as a digital image having the first scene (referred to as the first scene below) and a digital image having the second scene (referred to as the second scene below). The switching between the first scene and the second scene means that the digital camera acquires different image pictures in the S0stage. In the S0 stage, a photosensitive element of the digital camera may capture different scene images continuously in a constant image capturing rate (for example, 10 images per second).

Figure 1:
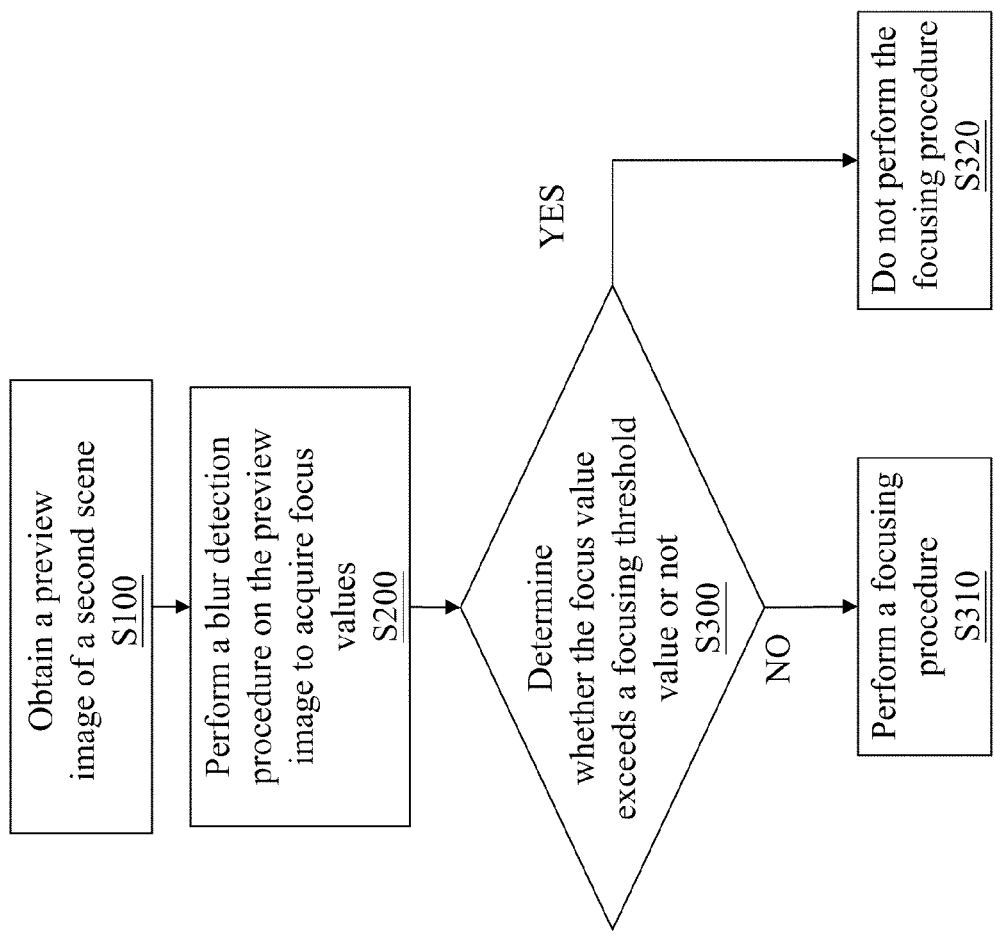
FIG. 1 is a flow chart of continuous focusing according to an embodiment of the present invention.

FIG. 1 is a schematic view of a continuous focusing method according to the present invention. According to the present invention, the continuous focusing method comprises the following steps.

In Step S100, a preview image of a second scene is obtained (that is, a preview image is obtained at the second scene).

In Step S200, a blur detection procedure is performed on the preview image to acquire focus values.

In Step S300, it is determined whether the focus value exceeds a focusing threshold value or not.

In Step S310, if not, a focusing procedure is performed.

In Step S320, if yes, the focusing procedure is not performed. That is, a current focusing focal length is maintained.

Figure 2:
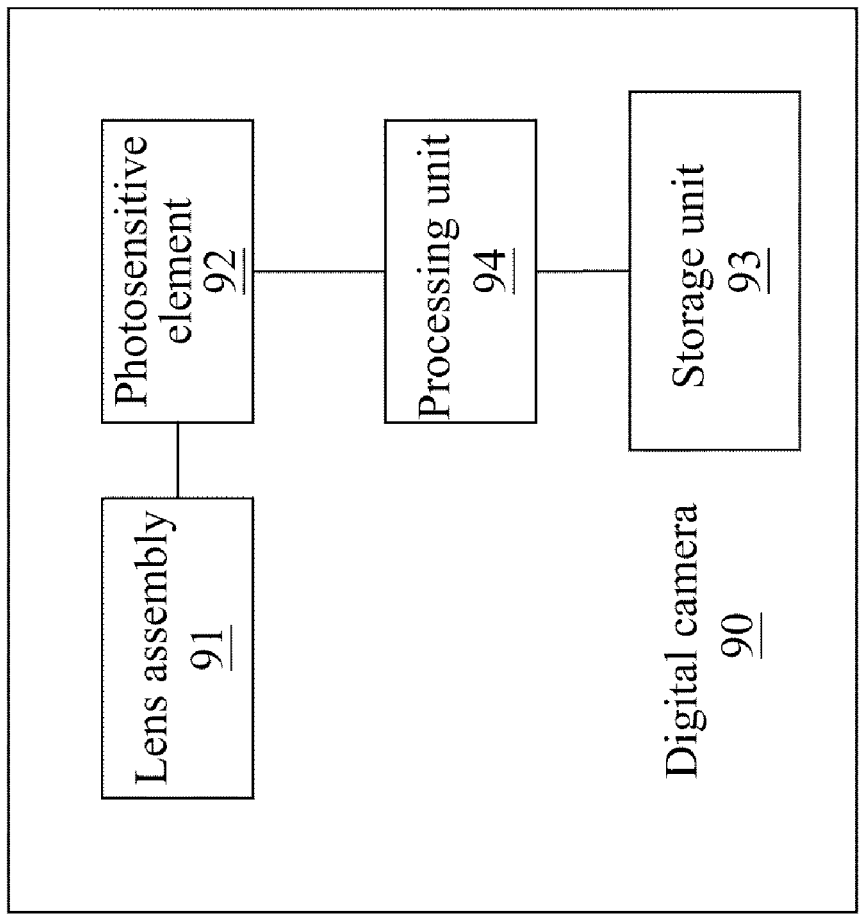
FIG. 2 is a schematic architectural view of a digital camera to which the present invention is applicable.

When the digital camera detects that the captured digital image is switched from the first scene to the second scene, the digital camera records a digital image of the second scene at the same time. Here, the digital image having the second scene is defined as a preview image. The digital camera may be, but not limited to, the digital camera as shown in FIG. 2. In order to clearly illustrate the method of the present invention, refer to FIGS. 1 and 2 at the same time. FIG. 2 is a schematic architectural view of a digital camera to which the present invention is applicable. A digital camera 90 comprises a lens assembly 91, a photosensitive element 92, a storage unit 93, and a processing unit 94. The lens assembly 91 has a drive motor (not shown) and a plurality of lenses (not shown). The digital camera 90 adjusts relative positions of all the lenses in the lens assembly by using the drive motor, so as to adjust a focal length for shooting an object to be shot. The photosensitive element 92 is connected to the lens assembly 91. The photosensitive element 92 converts an image picture of a current scene into electrical signals of a digital image. The photosensitive element 92 transfers the received image signals to the processing unit 94 continuously. The processing unit 94 is electrically connected to the photosensitive element 92 and the storage unit 93. The processing unit 94 determines that a focusing focal length of the lens assembly needs to be adjusted according to a preview image captured in the live view stage.

In the present invention, after the first scene is switched to the second scene, the processing unit 94 determines whether the digital camera 90 needs to adjust the focusing focal length once again according to a result of the blur detection procedure. The blur detection procedure generates a corresponding focus value according to the definition of each area (a selecting manner of each area is illustrated below) in the preview image. Finally, it is determined whether to perform the focusing procedure in Step S300 or not according to a number of the focus values. The greater the number of the focus values is, the higher definition the picture of the preview image will have. On the contrary, the less the number of the focus values is, the lower definition the picture of the preview image will have.

When the digital camera 90 acquires the image picture of the second scene, the image picture of the second scene is defined as a preview image. Each time after the processing unit 94 obtains a new preview image, the focus values are re-set, thereby avoiding bringing previous focus values into the current computation.

Figure 3:
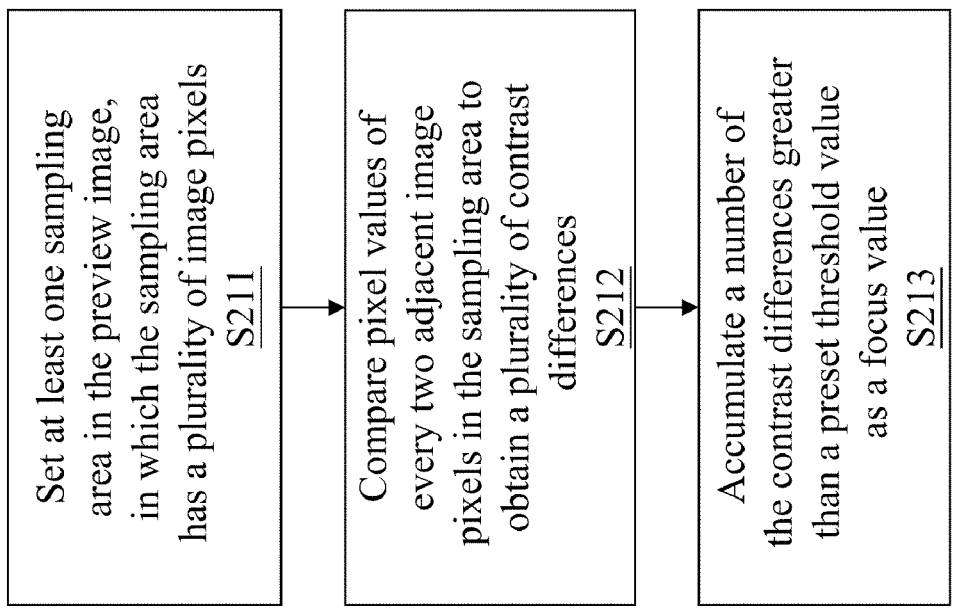
FIG. 3 is a schematic flow chart of a first blur detection procedure.

FIG. 3 is a schematic view of a blur detection procedure according to a first embodiment of the present invention. In the first embodiment, the blur detection procedure comprises the following steps.

In Step S211, at least one sampling area is further set in the preview image, in which the sampling area has a plurality of image pixels.

In Step S212, pixel values of every two adjacent image pixels in the sampling area are compared to obtain a plurality of contrast differences.

In Step S213, the number of the contrast differences greater than a preset threshold value is accumulated as a focus value.

Figure 4:
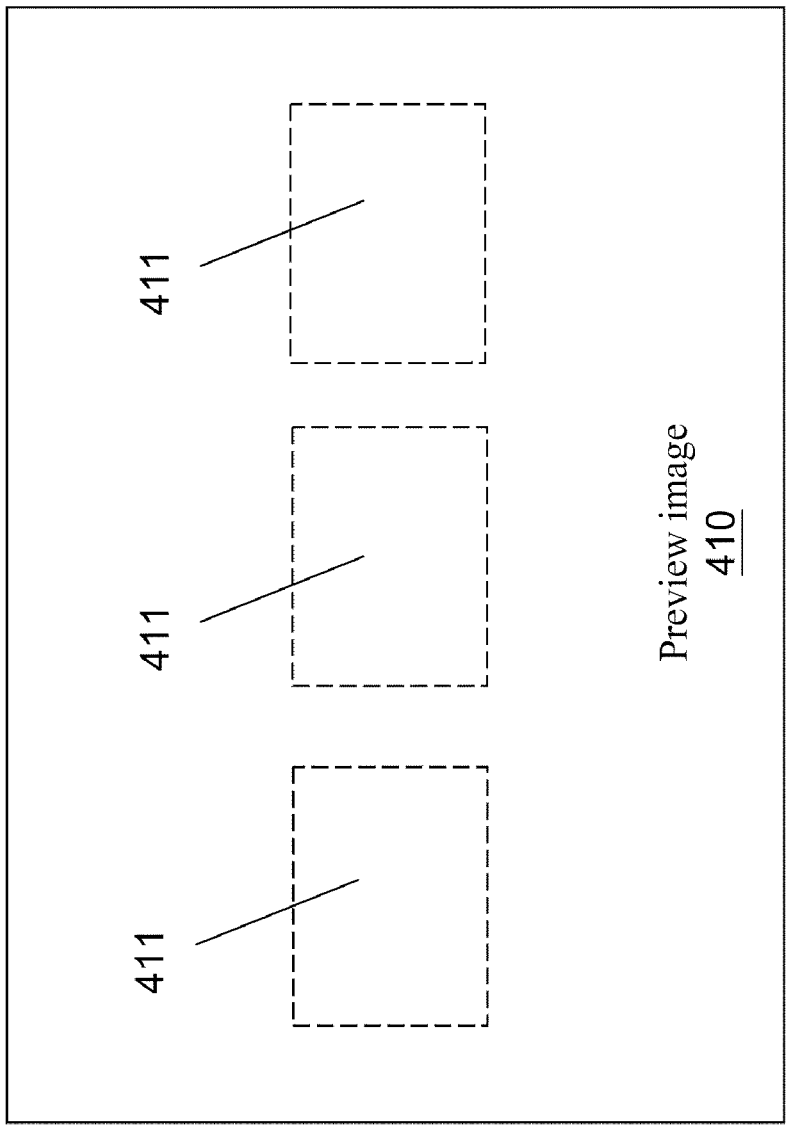
FIG. 4 is a schematic view of a sampling area.

In the preview image, at least one sampling area is further defined. The sampling area may be, but not limited to, the whole preview image. The sampling area may also be a fixed focusing frame or a human face focusing frame of the digital camera 90. In a common digital camera 90, a plurality of fixed focusing frames is set. The fixed focusing frames are distributed at a part of fixed positions in the preview image. The fixed focusing frames are used for providing the user with reference positions for focusing a scene to be shot. When the digital camera 90 sets a focusing frame as a central focusing frame, the digital camera 90 performs focusing comparison motions on the central focusing frame. Similarly, the focusing frames at the other positions in the area also provide the same functions. FIG. 4 is a schematic view of a sampling area. The human face focusing frame is a corresponding focusing frame generated according to a human face area determined by the digital camera 90. If a plurality of human face focusing frames appears at the same time, it is assumed in this embodiment of the present invention that the most important human face focusing frame is taken as a sampling area for making determination. The most important human face may be the largest human face focusing frame or an important person in the camera database.

Figure 5:
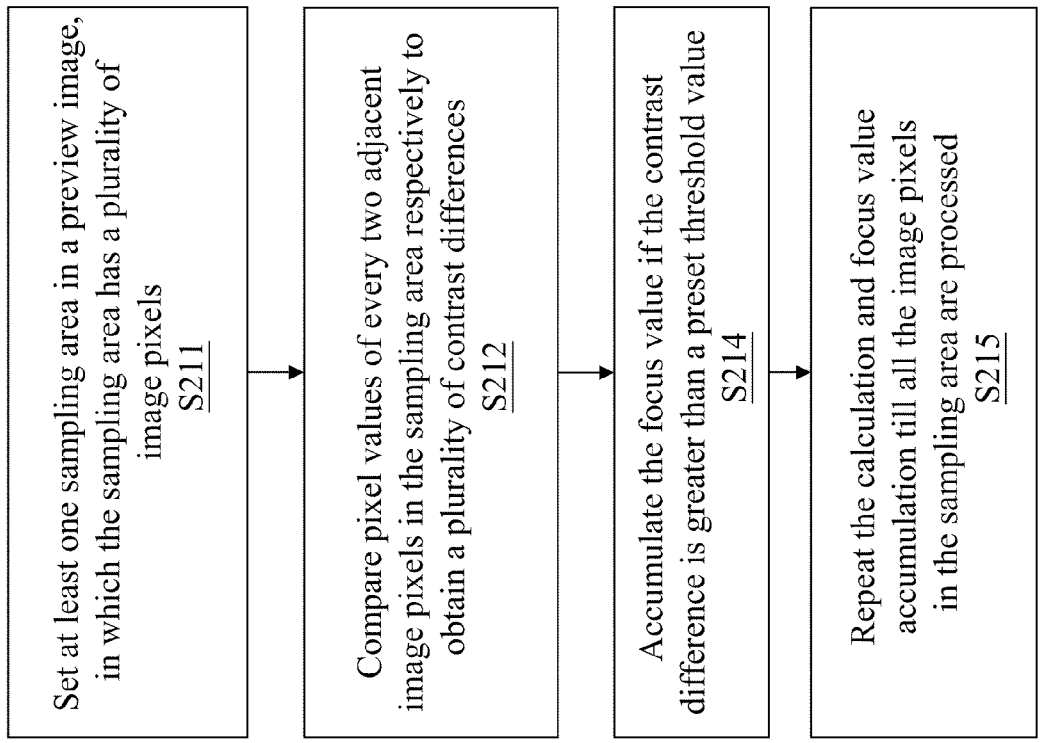
FIG. 5 is a schematic flow chart of a second blur detection procedure.

In the first embodiment, after all contrast differences are calculated, the focus value accumulation is performed. In addition, the accumulation step in Step S213 may be changed into determining whether the focus value needs to be accumulated or not every time after the contrast difference is calculated. Refer to FIG. 5 for such an operation process.

The second embodiment comprises the following steps.

In Step S211, at least one sampling area is further set in a preview image, in which the sampling area has a plurality of image pixels.

In Step S212, pixel values of every two adjacent image pixels in the sampling area are compared respectively to obtain a plurality of contrast differences.

In Step S214, if the contrast difference is greater than a preset threshold value, the focus value is accumulated.

In Step S215, the calculation and focus value accumulation are repeated till all the image pixels in the sampling area are processed.

Figures 6A, 6B:
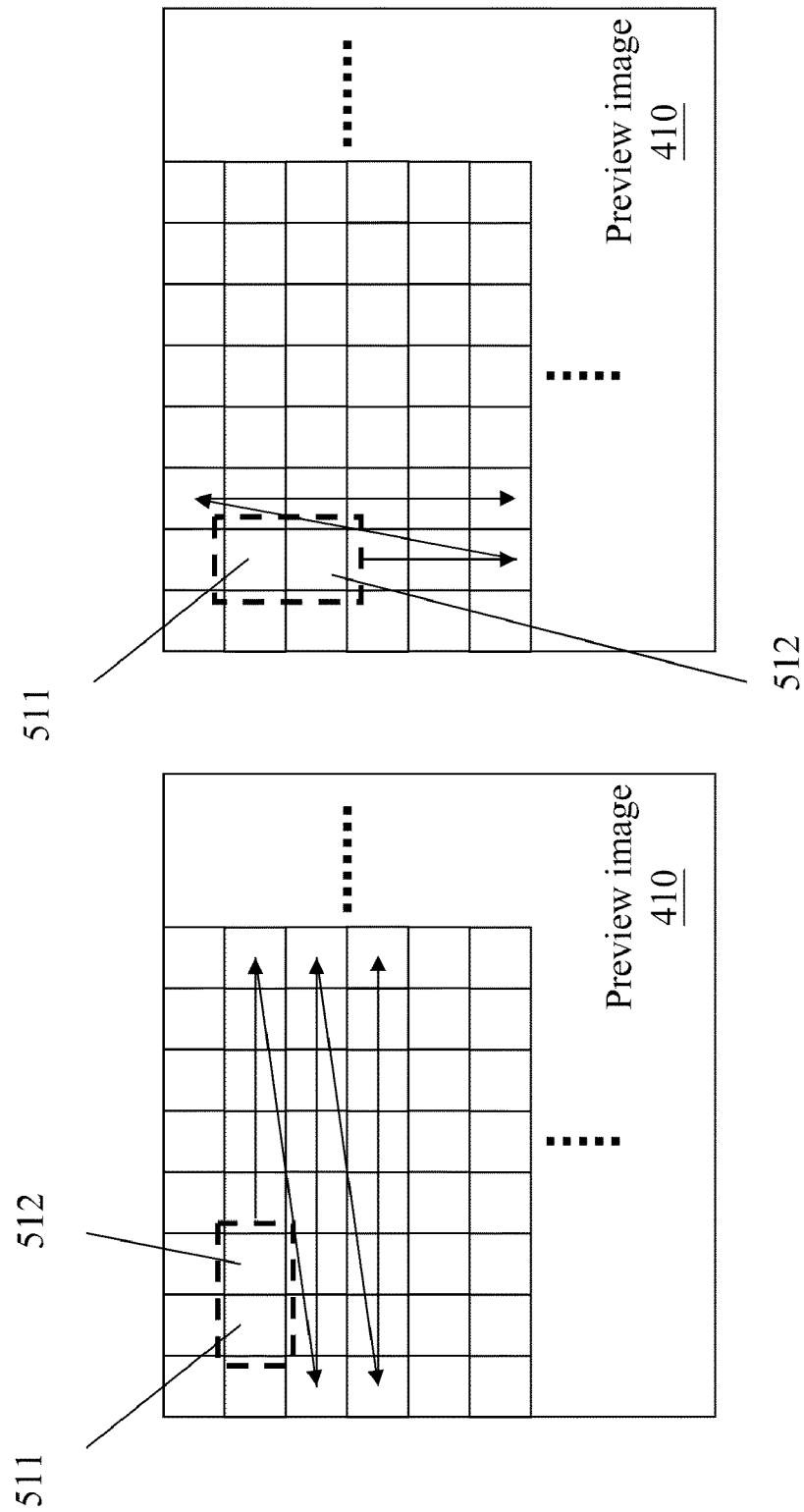
FIG. 6A is a schematic view of selecting horizontally adjacent pixels.
FIG. 6B is a schematic view of selecting vertically adjacent pixels.

During the calculation of the contrast differences in Step S212, two adjacent image pixels are respectively selected for processing. Here, one image pixel to be compared is defined as a target pixel 512 and the other selected adjacent pixel is defined as a comparison pixel 511. The comparison pixel 511 may be selected in a manner of selecting a pixel horizontally or vertically adjacent to the target pixel. The target pixel 512 may be selected in sequence according to an arrangement sequence of the pixels in the sampling area. For example, if a pixel set in the sampling area is a two-dimensional array (it is assumed that the pixel set is a pixel_array[m][n]), the target pixel 512 is selected in a manner of moving one by one from a position with a minimum serial number (that is, pixel_array[0][0]) to a position with a maximum serial number (that is, pixel_array[0][n−1]) in the array. After all pixels in one row have been processed, the selection is performed to the row next to the current row, as shown by arrows in FIG. 6A. In this case, the comparison pixel 511 may be selected from a pixel next to the target pixel 512 (in horizontal or vertical direction). FIGS. 6A and 6B are schematic views of selecting horizontally adjacent pixels and vertically adjacent pixels respectively. A subtraction operation is performed on the selected target pixel 512 and comparison pixel 511 to generate a contrast difference corresponding to the target pixel 512. Other target pixels 512 are then selected from the preview image 410 in sequence and corresponding contrast differences are calculated.

Figure 7:
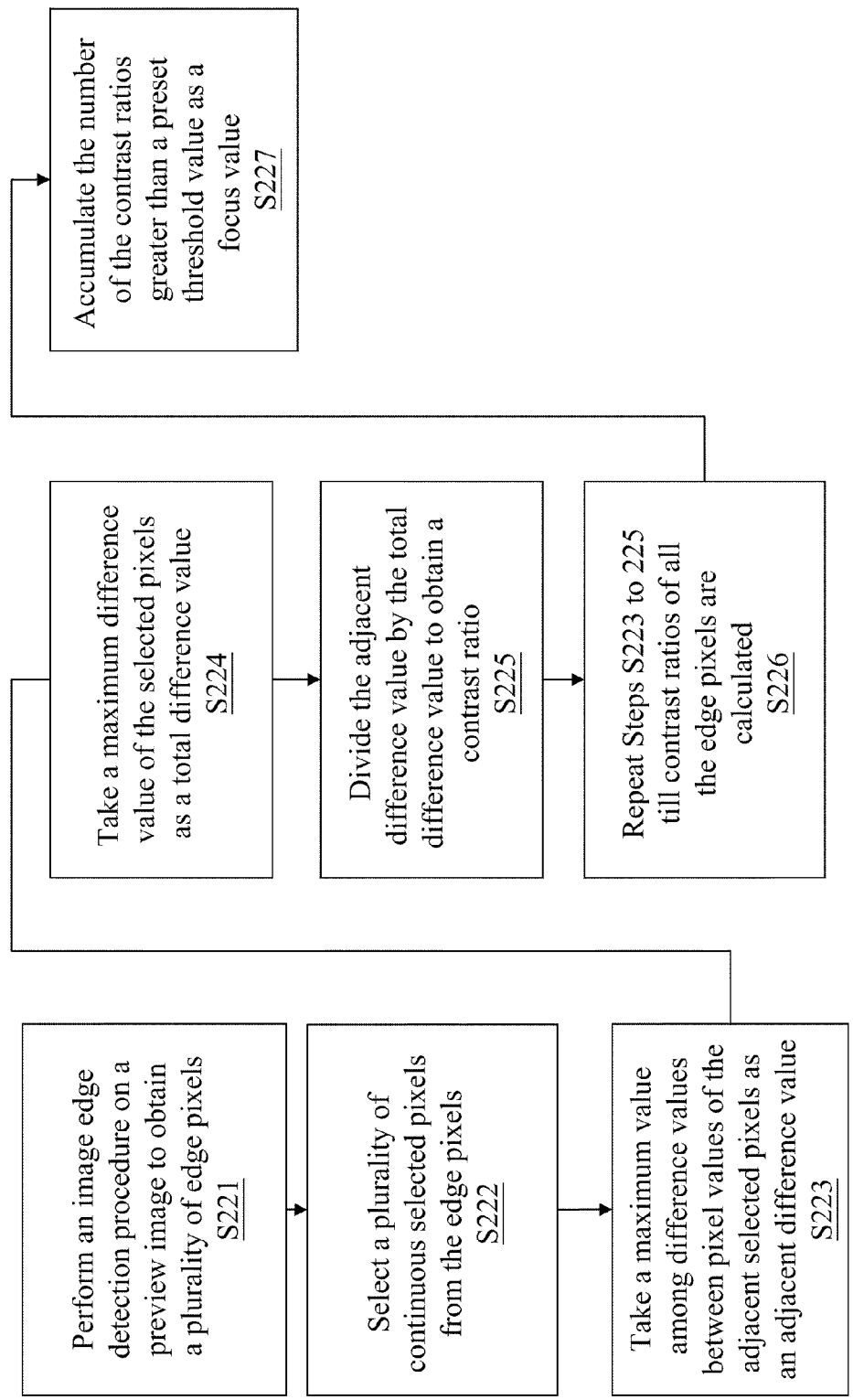
FIG. 7 is a schematic flow chart of a third blur detection procedure.

FIG. 7 is a schematic view of a third blur detection procedure according to an embodiment of the present invention. The blur detection procedure comprises the following steps.

In Step S221, an image edge detection procedure is performed on a preview image to obtain a plurality of edge pixels.

In Step S222, a plurality of continuous selected pixels is selected from the edge pixels.

In Step S223, a maximum value among difference values between pixel values of the adjacent selected pixels is taken as an adjacent difference value.

In Step S224, a maximum difference value of the selected pixels is taken as a total difference value.

In Step S225, the adjacent difference value is divided by the total difference value to obtain a contrast ratio.

In Step S226, Steps S223 to 225 are repeated till contrast ratios of all the edge pixels are calculated.

In Step S227, the number of the contrast ratios greater than a preset threshold value is accumulated as a focus value.

Figure 8A:
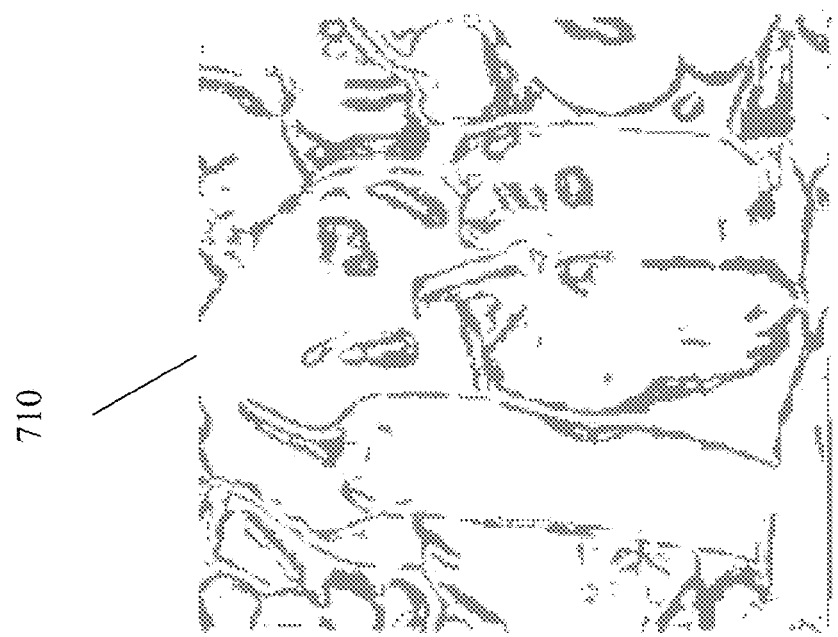
FIG. 8A is a schematic view of edges of image objects in a preview image.
Figure 8A:
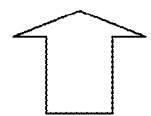
Figure 8A:
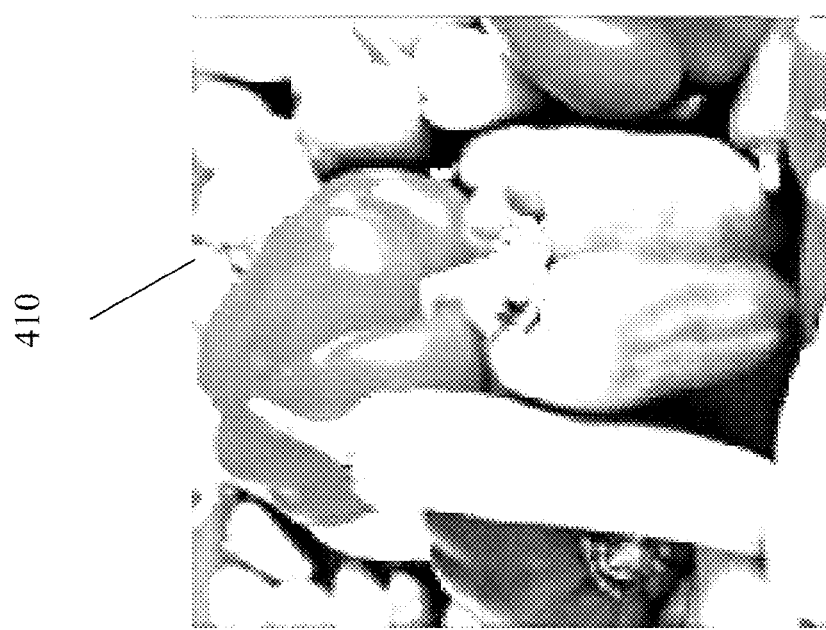

After the image edge detection procedure is performed on the preview image, a corresponding edge image is generated. In the present invention, the edge detection algorithm may be a Sobel edge detection algorithm, a Dijkstra's algorithm, a Canny edge detection algorithm, or the like. FIG. 8A is a schematic view of edges of image objects in a preview image.

Figure 8B:
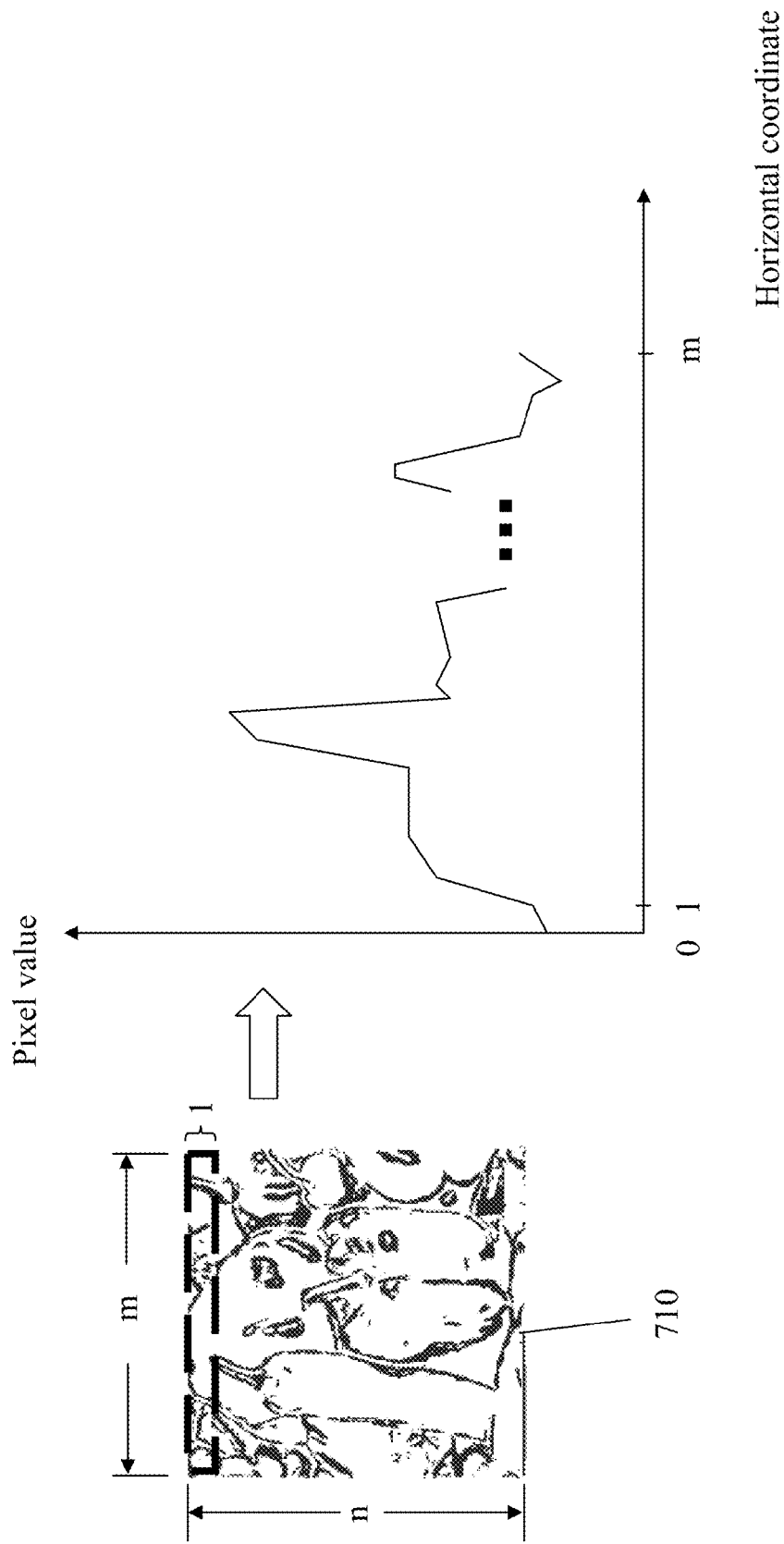
FIG. 8B is a schematic view of edges of image objects in a preview image.

Referring to FIG. 8B, pixel values of an edge image 710 are read in sequence in a row major/column major mode, thereby generating a corresponding gray scale distribution curve. For example, if the edge image 710 is regarded as a two-dimensional array (for example, the edge image 710 is a pixel_array[m][n]), the pixel values are read in sequence starting from the first row of the edge image 710 in the row major mode, that is, pixel_array[0][x], x={0,1 . . . ,n−1}. The read pixel values and positions are recorded in the gray scale distributed curve respectively. When the pixel values of the first row have been read, a gray scale distribution curve corresponding to the first row is generated. Corresponding gray scale distribution curves are generated through reading the other rows in the edge image 710. In addition, the gray scale distribution curves may be read in the column major mode.

Figure 8C:
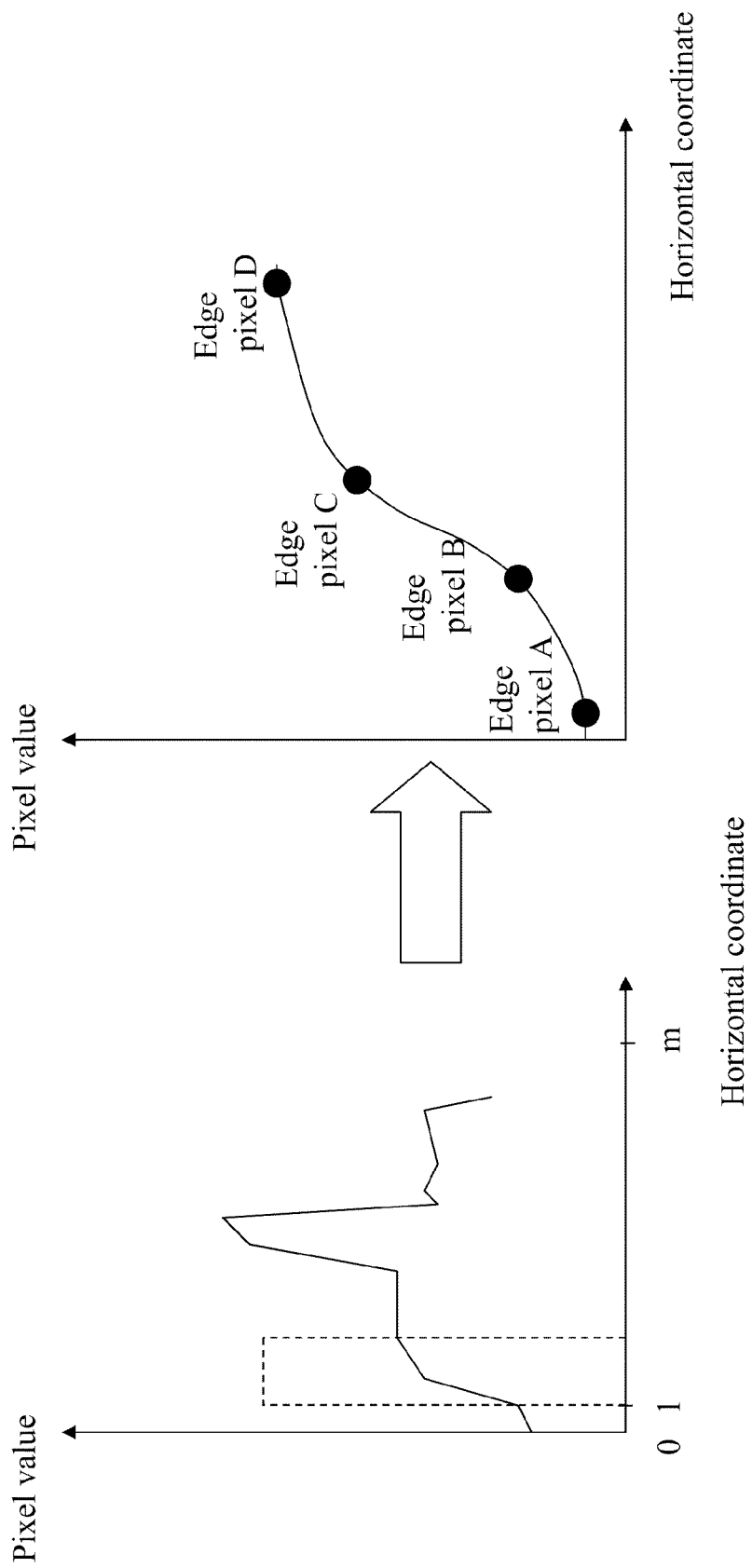
FIG. 8C is a schematic view of selecting edge pixels.

A segment having a pixel variation exceeding a variation threshold value is then selected from the gray scale distribution curve and is defined as an edge segment. A plurality of edge pixels is then selected from the edge segment. Taking FIG. 8C as an example for illustration, FIG. 8C has four edge pixels A, B, C, and D (an area circled by dashed lines in FIG. 8C). Every two adjacent edge pixels are selected at one time. Here, each group of comparison distribution values is defined as an edge pixel set. Therefore, the edge pixels may be divided into three edge pixel sets (A,B), (B,C), and (C,D) and a total pixel set (A,D). Each edge pixel set correspondingly has a respective difference value and the total pixel set also has a total difference value. An edge pixel set having a maximum difference value is then selected from the three edge pixel sets and the selected maximum difference value is divided by the total difference value to obtain a contrast ratio. In this embodiment, (X,Y) means an absolute value of a result of subtracting an X pixel value from a Y pixel value. Refer to the following Formula 1:

$$\text{Max}((A,B), (B,C), (C,D))/(D,A) \qquad \text{(Formula 1)}$$

The following example is taken herein for illustration, and it is assumed that four pixels A=38, B=46, C=68, D=82 are selected from an edge segment. The edge pixel sets are (A, B), (B, C), and (C, D) respectively, which are (A, B)=8, (B, C)=22, (C, D)=14 respectively, and a total difference value is (A, D)=44. A maximum value among the three edge pixel sets is 22, so that the adjacent difference value is (B,C), and the contrast ratio is 22/44=0.5.

If the edge segment only has two pixels, a difference value of this edge segment is not calculated. In this situation, a contrast ratio of the edge segment becomes 1, such that it cannot determine whether the edge segment is an edge of an image object. After the edge segment is calculated, the calculation of the other edge segments in the gray scale distribution curve is continued and the other difference values are obtained. After the difference values are obtained, it is compared whether each difference value is greater than the preset threshold value. The number of all the difference values greater than the preset threshold value is calculated and the accumulated number is defined as a focus value 810.

Figure 9:
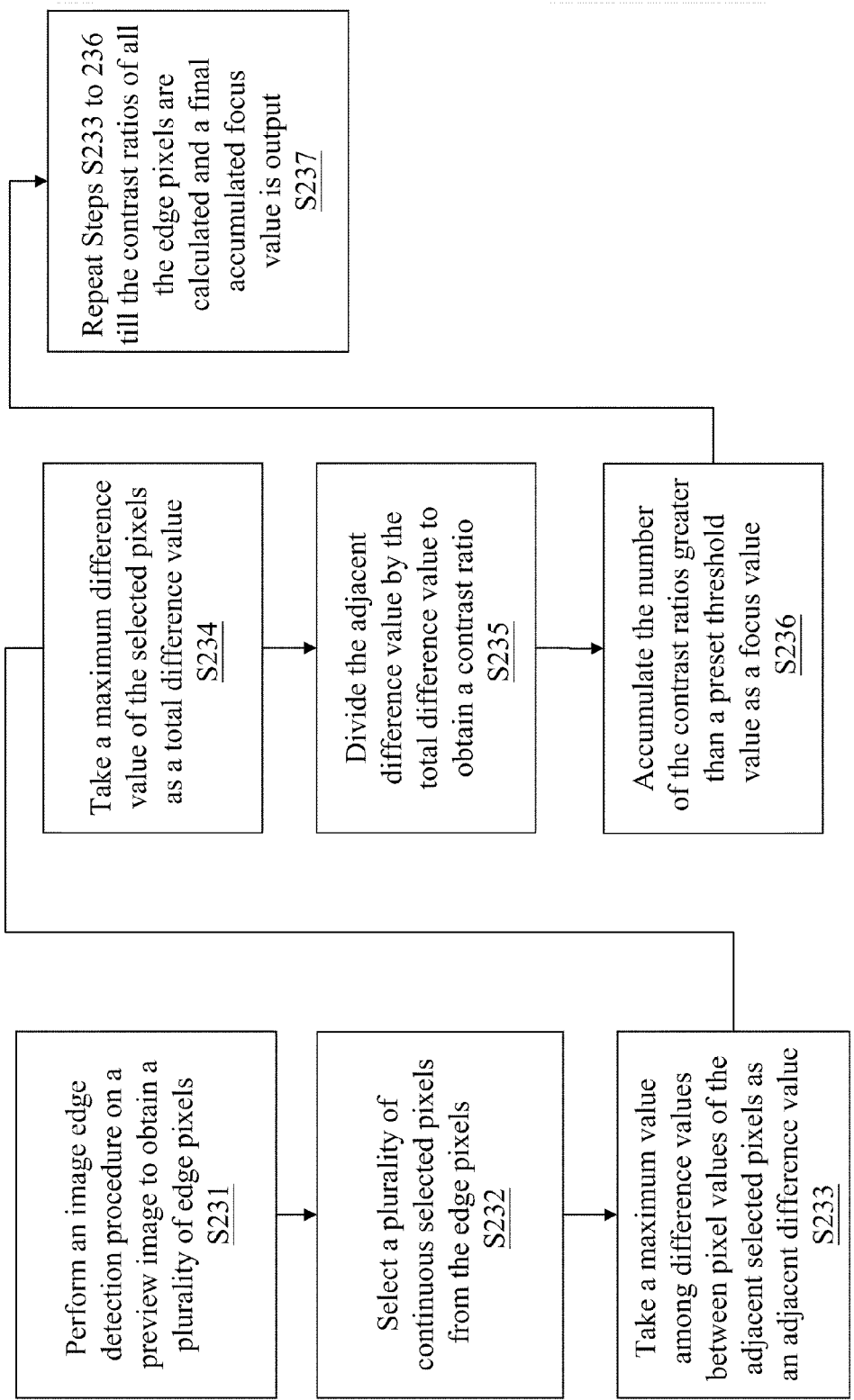
FIG. 9 is a schematic flow chart of a fourth blur detection procedure.

Different from the third embodiment in which the focus value starts to be accumulated after all the contrasts ratios are calculated, in the fourth embodiment, it is determined whether the generated contrast ratio is greater than a preset threshold value or not after each contrast ratio is calculated one by one, and the step is repeated till all the contrast ratios are calculated. FIG. 9 is a schematic flow chart of another embodiment.

In Step S231, an image edge detection procedure is performed on a preview image to obtain a plurality of edge pixels.

In Step S232, a plurality of continuous selected pixels is selected from the edge pixels.

In Step S233, a maximum value among difference values between pixel values of the adjacent selected pixels is taken as an adjacent difference value.

In Step S234, a maximum difference value of the selected pixels is taken as a total difference value.

In Step S235, the adjacent difference value is divided by the total difference value to obtain a contrast ratio.

In Step S236, the number of the contrast ratios greater than a preset threshold value is accumulated as a focus value.

In Step S237, Steps S233 to 236 are repeated till the contrast ratios of all the edge pixels are calculated and a final accumulated focus value is output.

Figure 10:
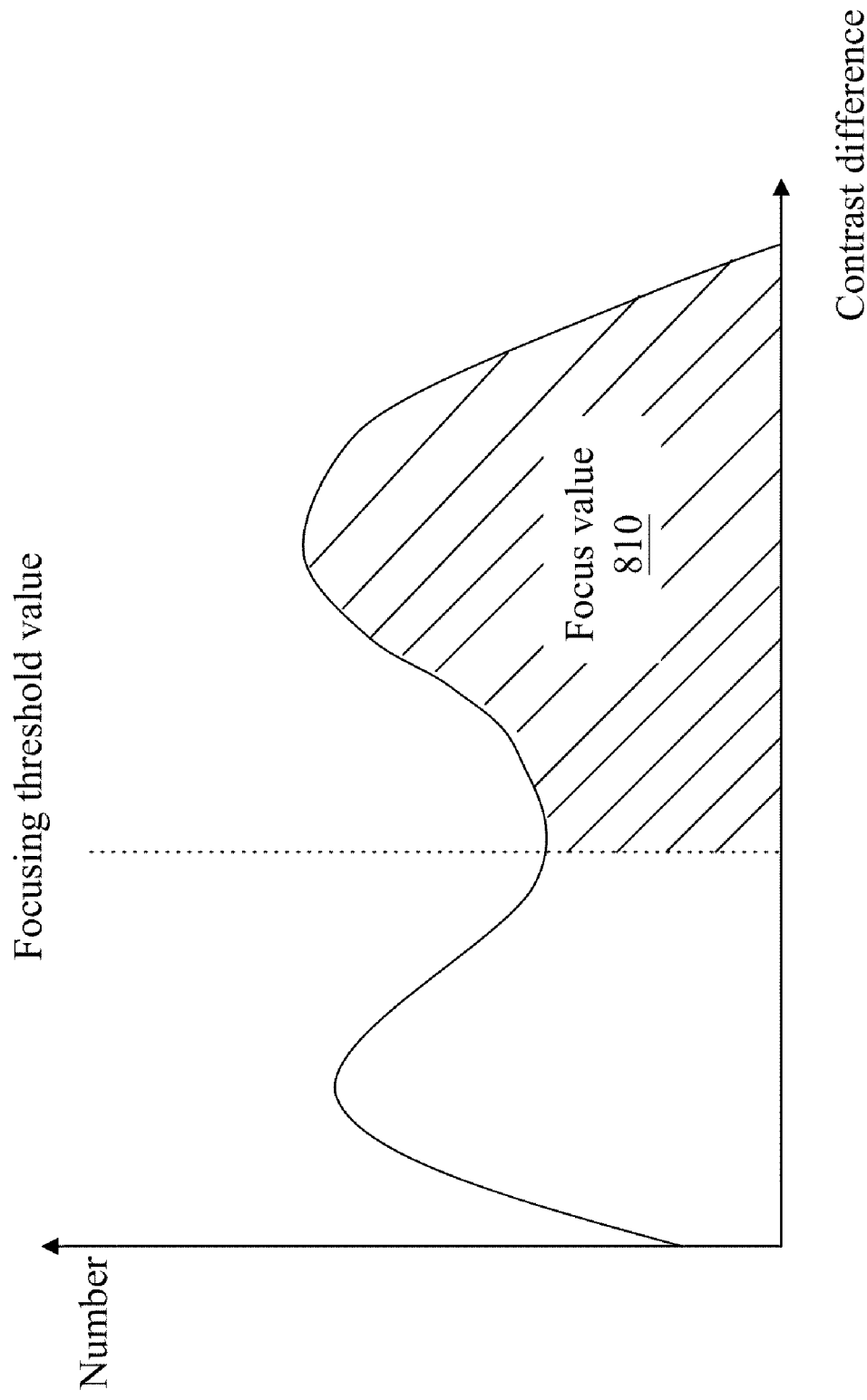
FIG. 10 is a statistical chart of focus values according to an embodiment of the present invention.

Finally, a statistical chart is used for illustration (referring to FIG. 10). A horizontal axis in FIG. 10 represents a contrast difference and a vertical axis in FIG. 10 represents a corresponding number of the contrast differences. Taking the first embodiment as an example, in the preview image, a sampling area of 100*100 pixels is used as a determination reference for focusing. Thus, a total number of the focus values 810 in the sampling area is 99*100 and it is assumed that the focusing threshold value is 100. If the number of the focus values 810 greater than the preset threshold value is 45, representing that the preview image is blurred, and the lens positions in the lens assembly need to be adjusted again, thereby acquiring a corresponding focusing focal length. On the contrary, if the number of the focus values 810 smaller than the preset threshold value is 30, representing that the preview image 410 is clear, and the focusing does not need to be performed again.

The present invention provides a continuous focusing method for a digital camera 90, which is applicable to determine whether the digital camera 90 needs to adjust the focusing focal length again after the digital camera 90 switches among different scene pictures. In such a manner, the digital camera 90 does not need to drive lenses to perform focusing motions continuously, thereby realizing power saving and fast focusing effects.

What is claimed is:

1. A continuous focusing method for a digital camera, applicable to determine whether the digital camera performs a continuous focusing procedure or not when the digital camera switches from a first scene to a second scene in a live view stage, the continuous focusing method comprising:

obtaining a preview image at the second scene;

performing a blur detection procedure on the preview image to acquire a focus value, wherein the blur detection procedure comprises:

setting at least one sampling area in the preview image, wherein the sampling area has a plurality of image pixels;

comparing pixel values of every two adjacent image pixels in the sampling area respectively to obtain a plurality of contrast differences; and accumulating a number of the contrast differences greater than a preset threshold value as the focus value;

determining whether the focus value exceeds a focusing threshold value or not; and if not, performing the continuous focusing procedure.

\* \* \* \* \*